United States Patent
Yee et al.

(10) Patent No.: US 9,871,454 B1
(45) Date of Patent: Jan. 16, 2018

(54) METHOD OF CONTROLLING SYNCHRONOUS RECTIFIER METAL-OXIDE-SEMICONDUCTOR WITH PULSE TRANSFORMER

(71) Applicant: Sync Power Corp., Taipei (TW)

(72) Inventors: Hsian-Pei Yee, Taipei (TW); Ya-Wu Chung, Taipei (TW); Chun-Jen Huang, Taipei (TW)

(73) Assignee: Sync Power Corp., Taipei (TW)

( * ) Notice: Subject to any disclaimer, the term of this patent is extended or adjusted under 35 U.S.C. 154(b) by 0 days.

(21) Appl. No.: 15/627,433

(22) Filed: Jun. 19, 2017

(51) Int. Cl.
*H02M 3/335* (2006.01)
*H02M 1/36* (2007.01)
*H02M 7/48* (2007.01)

(52) U.S. Cl.
CPC ......... *H02M 3/33523* (2013.01); *H02M 1/36* (2013.01); *H02M 3/33576* (2013.01); *H02M 7/48* (2013.01); *H02M 7/4807* (2013.01)

(58) Field of Classification Search
None
See application file for complete search history.

(56) References Cited

U.S. PATENT DOCUMENTS

| | | | | |
|---|---|---|---|---|
| 6,473,317 | B1* | 10/2002 | Simopoulos | H02M 3/33592 363/21.06 |
| 9,755,529 | B2* | 9/2017 | Chen | H02M 3/33515 |
| 2011/0305043 | A1* | 12/2011 | Matsumoto | H02M 3/33592 363/21.01 |
| 2012/0120533 | A1* | 5/2012 | Huang | H02M 3/33507 361/56 |
| 2012/0262147 | A1* | 10/2012 | Wang | G01R 31/3278 324/76.11 |
| 2012/0281438 | A1* | 11/2012 | Fang | H02M 3/33507 363/21.12 |
| 2014/0268919 | A1* | 9/2014 | Yao | H02M 3/33523 363/21.15 |
| 2015/0162843 | A1* | 6/2015 | Chen | H02M 1/32 363/21.16 |
| 2015/0280573 | A1* | 10/2015 | Gong | H02M 3/33523 363/21.14 |
| 2016/0241150 | A1* | 8/2016 | Hsu | H02M 3/33523 |
| 2016/0329819 | A1* | 11/2016 | Chen | H02M 3/33515 |
| 2016/0359419 | A1* | 12/2016 | Lin | H02M 1/08 |
| 2016/0359421 | A1* | 12/2016 | Lin | H02M 3/33592 |
| 2016/0370409 | A1* | 12/2016 | Lee | G01R 23/005 |

(Continued)

*Primary Examiner* — Yusef Ahmed
(74) *Attorney, Agent, or Firm* — CKC & Partners Co., Ltd.

(57) ABSTRACT

The present disclosure provides an isolated power supply and a method of controlling the isolated power supply. The isolated power supply includes a primary side circuit and a secondary side circuit. The primary side circuit includes a first switch with a first voltage thereon, an auxiliary winding with a second voltage thereon, and a controller. The secondary side circuit includes a second switch and a pulse transformer. The method includes: retrieving the first voltage or the second voltage as a specific voltage; sensing an oscillation waveform of the specific voltage after the second switch is turned off at a first timing point in a first cycle; retrieving a second timing point based on the oscillation waveform; and controlling the pulse transformer to adaptively adjust a third timing point for turning off the second switch in a second cycle based on the second timing point retrieved in the first cycle.

18 Claims, 9 Drawing Sheets

(56) References Cited

U.S. PATENT DOCUMENTS

| | | | |
|---|---|---|---|
| 2017/0025966 A1* | 1/2017 | Chang | H02M 3/33592 |
| 2017/0047851 A1* | 2/2017 | Huang | H02M 3/33515 |
| 2017/0149338 A1* | 5/2017 | Yee | H02M 3/33507 |
| 2017/0155335 A1* | 6/2017 | Chang | H02M 1/08 |
| 2017/0250612 A1* | 8/2017 | Malinin | H02M 3/33507 |
| 2017/0288553 A1* | 10/2017 | Fahlenkamp | H02M 3/33515 |

* cited by examiner

METHOD OF CONTROLLING SYNCHRONOUS RECTIFIER METAL-OXIDE-SEMICONDUCTOR WITH PULSE TRANSFORMER

BACKGROUND

Technical Field

The present disclosure relates to an isolated power supply. More particularly, the present disclosure relates to an isolated power supply that adaptively adjust the timing for turning off the synchronous rectifier metal-oxide-semiconductor (SRMOS) on the secondary side.

Description of Related Art

In an isolated power supply, pulse transformers are often used to control SRMOS on the secondary side by the primary side switch mode controller. The primary side switch mode controller controls the primary MOS directly while controlling the SRMOS through a pulse transformer. The primary side switch mode controller can alternatively and successively turn on the primary MOS and the SRMOS. Taking FIG. 1 as an example, which is a sequence of the primary MOS and the SRMOS being turned on or off when the isolated power supply operates in a continuous conduction mode (CCM). In one cycle of FIG. 1, the primary side switch mode controller may turn on the primary MOS (while keeping the SRMOS off) to charge the transformer, and turn ON the SRMOS (while keeping the primary MOS off) to discharge the energy of the transformer to the output. The next cycle starts before the energy of the transformer is completely discharged (i.e., before the transformer current reaches zero).

Generally, the primary side switch mode controller turns off the SRMOS prior to turning on the primary MOS, which properly arranges the sequence of the primary MOS and the SRMOS to prevent the SRMOS from reverse conduct.

Conventionally, although the pulse transformer allows the SR control signal from the primary side switch mode controller through the isolation, it merely functions well when the isolated power supply operates in the CCM. In the discontinuous conduction mode (DCM), when the transformer has no energy, the primary side switch mode controller does not possess the necessary information to turn off the SRMOS. If the SRMOS is kept on after the energy of the transformer was completely spent in the DCM, the voltage of the transformer will be clamped by the output voltage, and the output capacitors will start to charge the transformer as shown in FIG. 2, which is a sequence of the primary MOS and the SRMOS being turned on or off when the isolated power supply operates in the DCM. That is, the energy flows from the output to the input for having a negative transformer current, which is not desirable and significantly reduces overall efficiency. In this situation, a much higher transformer current for the same load current will be required.

Thus, it is important to turn off the SRMOS at the correct timing in the DCM for avoiding the negative transformer current.

SUMMARY

The present disclosure provides an isolated power supply. The isolated power supply includes a primary side circuit and a secondary side circuit. The primary side circuit includes a first switch, an auxiliary winding, and a controller. The first switch has a first voltage thereon. The auxiliary winding has a first terminal and a second terminal. The controller is coupled to the first switch or the auxiliary winding. The controller retrieves the first voltage or a second voltage at the first terminal of the auxiliary winding as a specific voltage. The secondary side circuit is coupled to the primary side circuit and includes a second switch and a pulse transformer. The pulse transformer is coupled to the second switch and the controller, wherein the pulse transformer turns off the second switch in response to a command from the controller. The controller senses an oscillation waveform of the specific voltage after the second switch is turned off at a first timing point in a first cycle, retrieves a second timing point based on the oscillation waveform, controls the pulse transformer to adaptively adjust a third timing point for turning off the second switch in a second cycle based on the second timing point retrieved in the first cycle.

The present disclosure provides a method of controlling an isolated power supply. The isolated power supply includes a primary side circuit and a secondary side circuit. The primary side circuit includes a first switch with a first voltage thereon, an auxiliary winding with a second voltage thereon, and a controller. The secondary side circuit includes a second switch and a pulse transformer. The method includes following steps: retrieving, by the controller, the first voltage or the second voltage as a specific voltage; sensing, by the controller, an oscillation waveform of the specific voltage after the second switch is turned off at a first timing point in a first cycle; retrieving, by the controller, a second timing point based on the oscillation waveform; and controlling, by the controller, the pulse transformer to adaptively adjust a third timing point for turning off the second switch in a second cycle based on the second timing point retrieved in the first cycle.

BRIEF DESCRIPTION OF THE DRAWINGS

The present disclosure can be more fully understood by reading the following detailed description of the embodiment, with reference made to the accompanying drawings as follows.

DETAILED DESCRIPTION

For properly turning off the SRMOS at the correct timing in the DCM, the present disclosure proposes an isolated power supply and a method for controlling the isolated power supply, which adaptively adjusts the timing for turning off the SRMOS based on the oscillation waveform of the voltage of the transformer in the previous cycle. As such, the possibility of having a negative transformer current can be reduced, and hence the overall efficiency of the isolated power supply can be improved. Detailed descriptions will be discussed in the following paragraphs.

Figure 1:
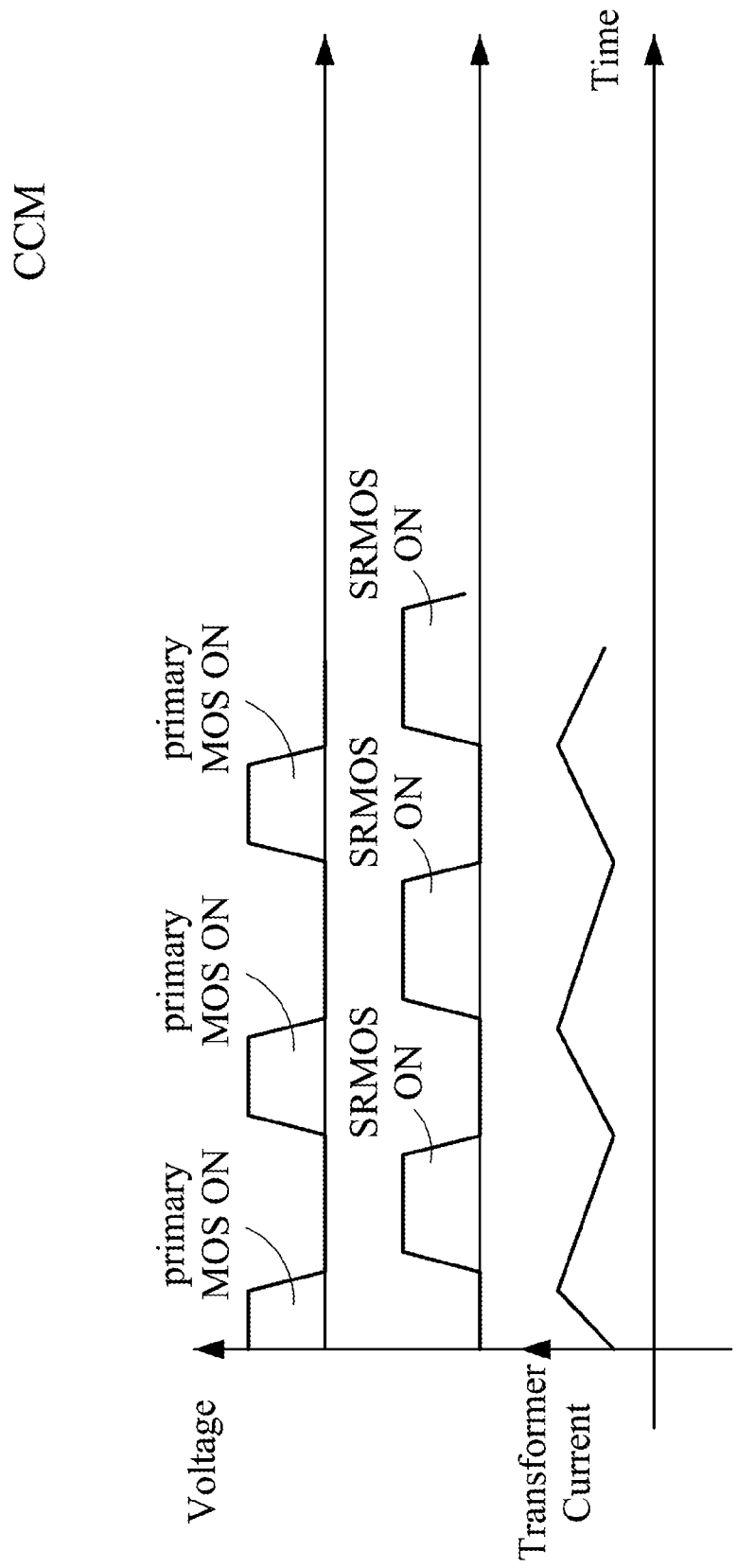
FIG. 1 is a sequence of the primary MOS and the SRMOS being turned on or off when the isolated power supply operates in a continuous conduction mode (CCM)
Figure 2:
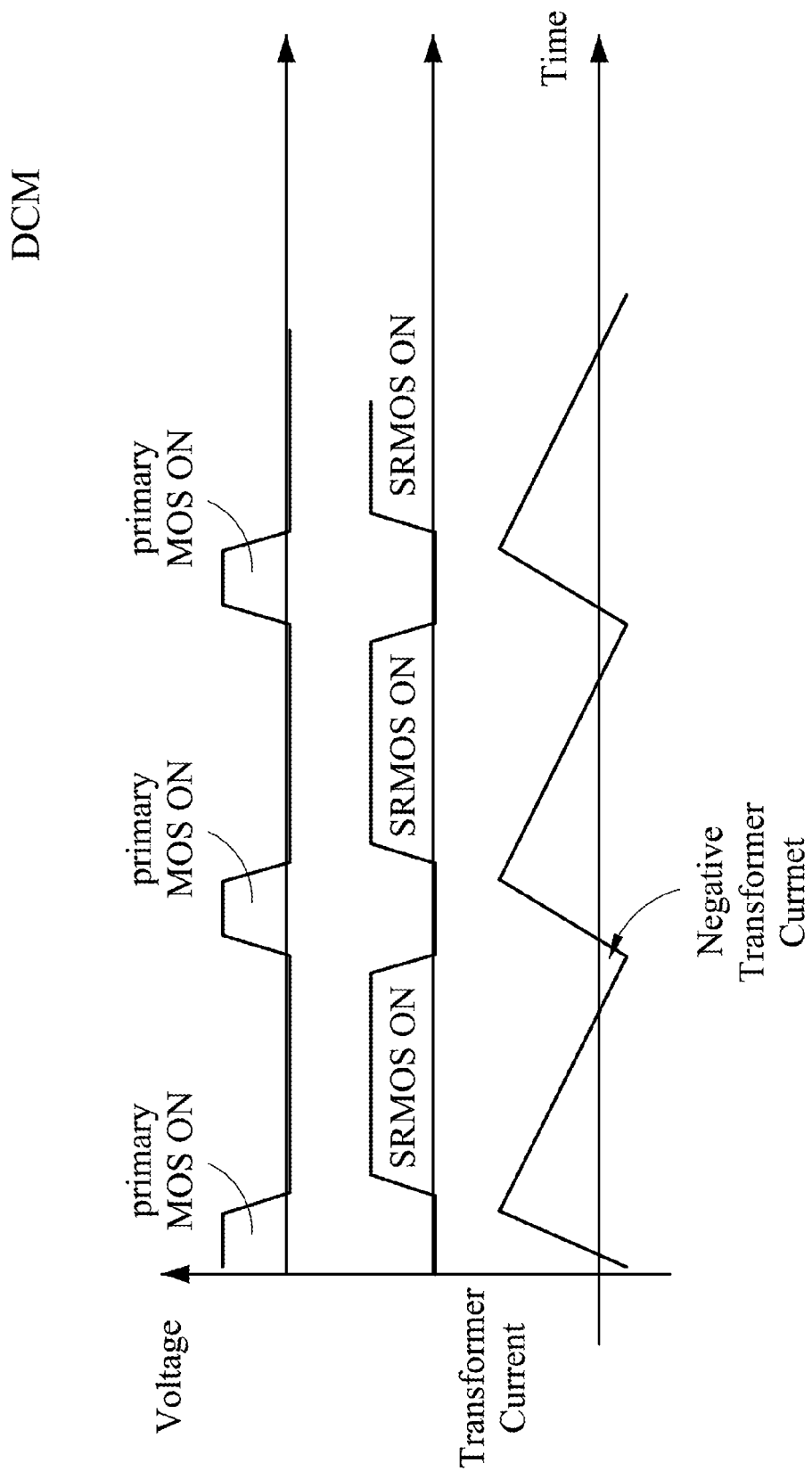
FIG. 2 is a sequence of the primary MOS and the SRMOS being turned on or off when the isolated power supply operates in the DCM.
Figure 3:
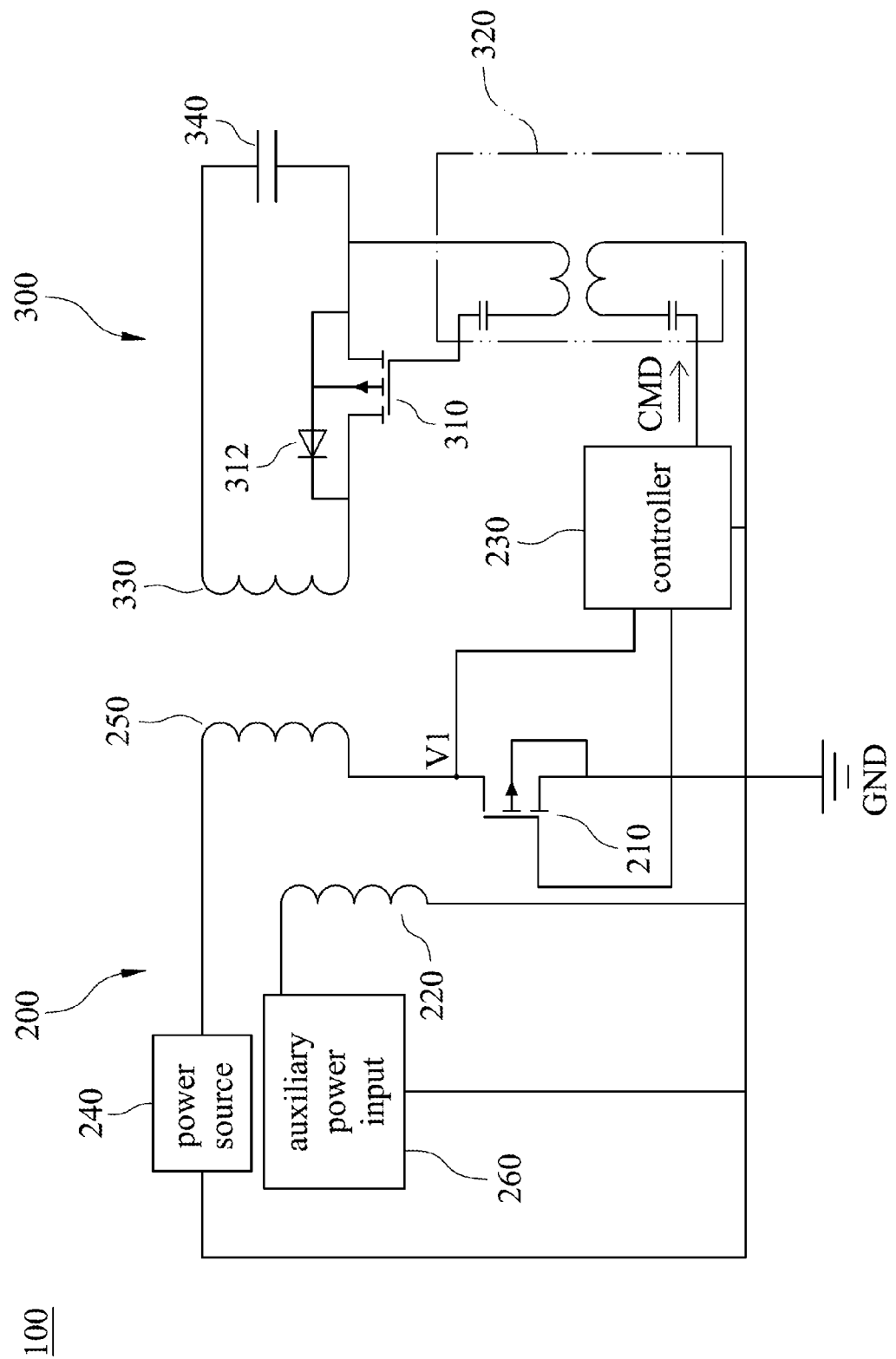
FIG. 3 is a schematic diagram illustrating an isolated power supply according to an exemplary embodiment of the present disclosure.

FIG. 3 is a schematic diagram illustrating an isolated power supply 100 according to an exemplary embodiment of the present disclosure. In the present embodiment, the isolated power supply 100 includes a primary side circuit 200 and a secondary side circuit 300. The primary side circuit 200 includes a first switch 210, an auxiliary winding 220, and a controller 230. The first switch 210 has a first voltage V1 thereon. The auxiliary winding 220 has a first terminal and a second terminal, wherein the first terminal of the auxiliary winding 220 may be coupled to a conventional auxiliary power input circuit, and the second terminal of the auxiliary winding 220 may be coupled to a ground GND, but the disclosure is not limited thereto.

The controller 230 is coupled to the first switch 210 and capable of retrieving the first voltage V1. Specifically, the controller 230 has an input terminal coupled to a first terminal of the first switch 210, a first output terminal coupled to a control terminal of the first switch 210, a second output terminal, and a ground terminal coupled to a second terminal of the first switch 210 and the ground GND.

Besides, the primary side circuit 200 may further include a power source 240, a first winding 250, and an auxiliary power input 260. The power source 240 may be a conventional AC source input including an AC power, a full bridge rectifier, etc., wherein a first terminal of the power source 240 may be coupled to a first terminal of the first winding 250, and a second terminal of the power source 240 may be coupled to the ground GND. A second terminal of the first winding 250 is coupled to the first terminal of the first switch 210 and the input terminal of the controller 230. A first terminal of the auxiliary power input 260 is coupled to a first terminal of the auxiliary winding 220, and a second terminal of the auxiliary power input 260 is coupled to the ground GND.

The secondary side circuit 300 is coupled to the primary side circuit 200 and includes a second switch 310 and a pulse transformer 320 coupled to the second switch 310. Specifically, the second switch 310 may be an SRMOS (which operates as a body diode 312 when being turned off) and has a first terminal, a second terminal, and a control terminal. The pulse transformer 320 has a first input terminal coupled to the first terminal of the second switch 310, a second input terminal coupled to the second output terminal of the controller 230, an output terminal coupled to the control terminal of the second switch 310, and a ground terminal coupled to the ground GND. In one embodiment, the pulse transformer 320 turns off the second switch 310 in response to a command CMD from the controller 230, and the mechanism thereof will be further discussed in the following descriptions.

As shown in FIG. 3, the secondary side circuit 300 may further include a second winding 330 and an output capacitor 340. The second winding 330 has a first terminal and a second terminal, wherein the second terminal of the second winding 330 is coupled to the second terminal of the second switch 310. The output capacitor 340 has a first terminal and a second terminal, wherein the first terminal of the output capacitor 340 is coupled to the first terminal of the second winding 330, and the second terminal of the output capacitor 340 is coupled to the first terminal of the second switch 310.

As mentioned in the background, when the isolated power supply 100 works in the DCM, the second switch 310 (e.g., the SRMOS) should be turned off at the proper timing to prevent the output capacitor 340 from charging the transformer formed by the first winding 250 and the second winding 330. In response thereto, the present disclosure proposes the method of controlling the isolated power supply 100 as illustrated in FIG. 4.

Figure 4:
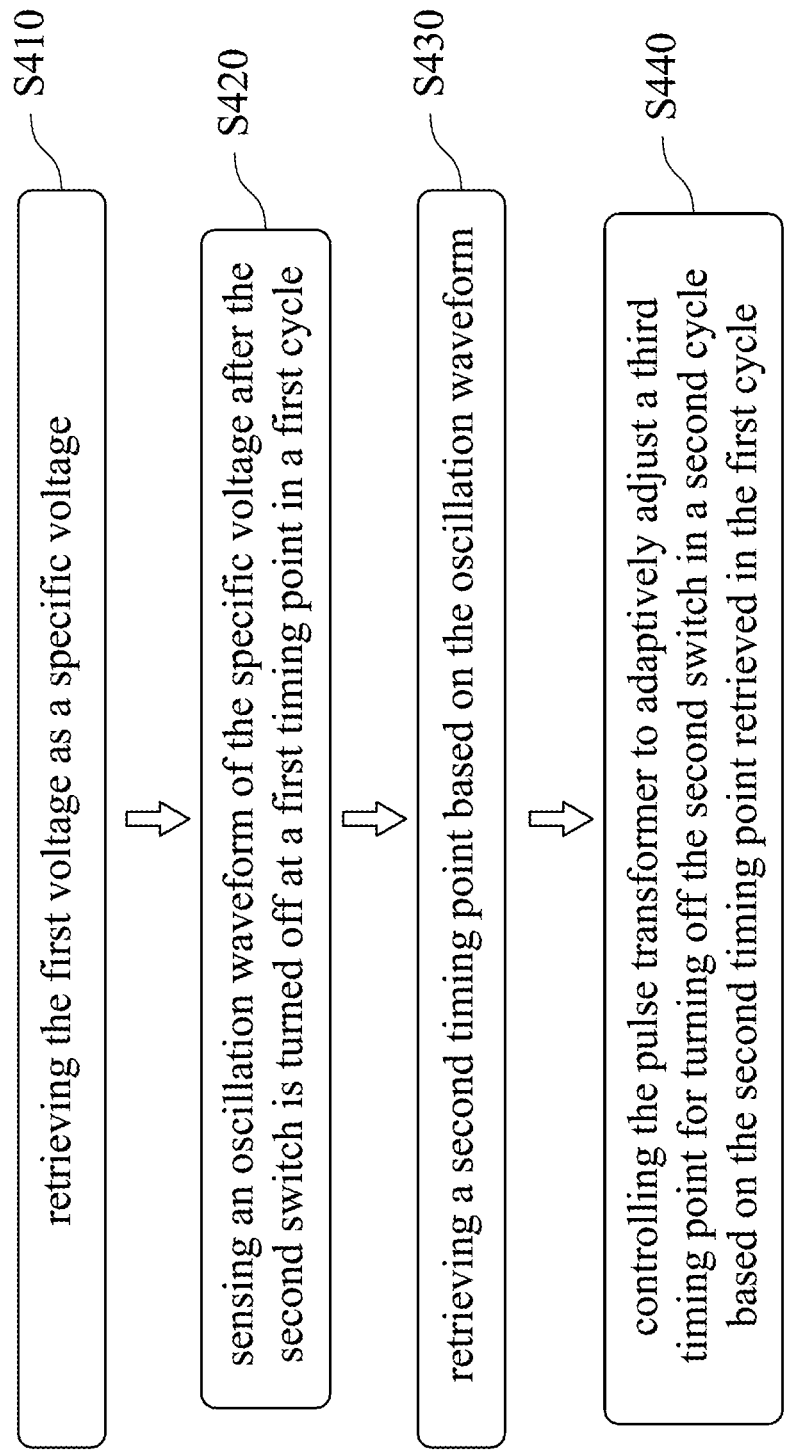
FIG. 4 is a flow chart illustrating the method for controlling the isolated power supply according to an exemplary embodiment of the present disclosure.

See FIG. 4, which is a flow chart illustrating the method for controlling the isolated power supply 100 according to an exemplary embodiment of the present disclosure. In the present embodiment, the method of FIG. 4 may be implemented by the controller 230 of FIG. 3, but the present disclosure is not limited thereto.

In step S410, the controller 230 retrieves the first voltage V1 as a specific voltage. In other embodiments, the controller 230 may also retrieve the voltage at the first terminal of the auxiliary winding 220 as the specific voltage based on the requirements of the designer, but the present disclosure is not limited thereto.

In step S420, the controller 230 senses an oscillation waveform of the specific voltage after the second switch 310 is turned off at a first timing point in a first cycle. For better understanding, please refer to FIG. 5, which is the waveform of the specific voltage in the first cycle according to an exemplary embodiment of the present disclosure.

Figure 5:
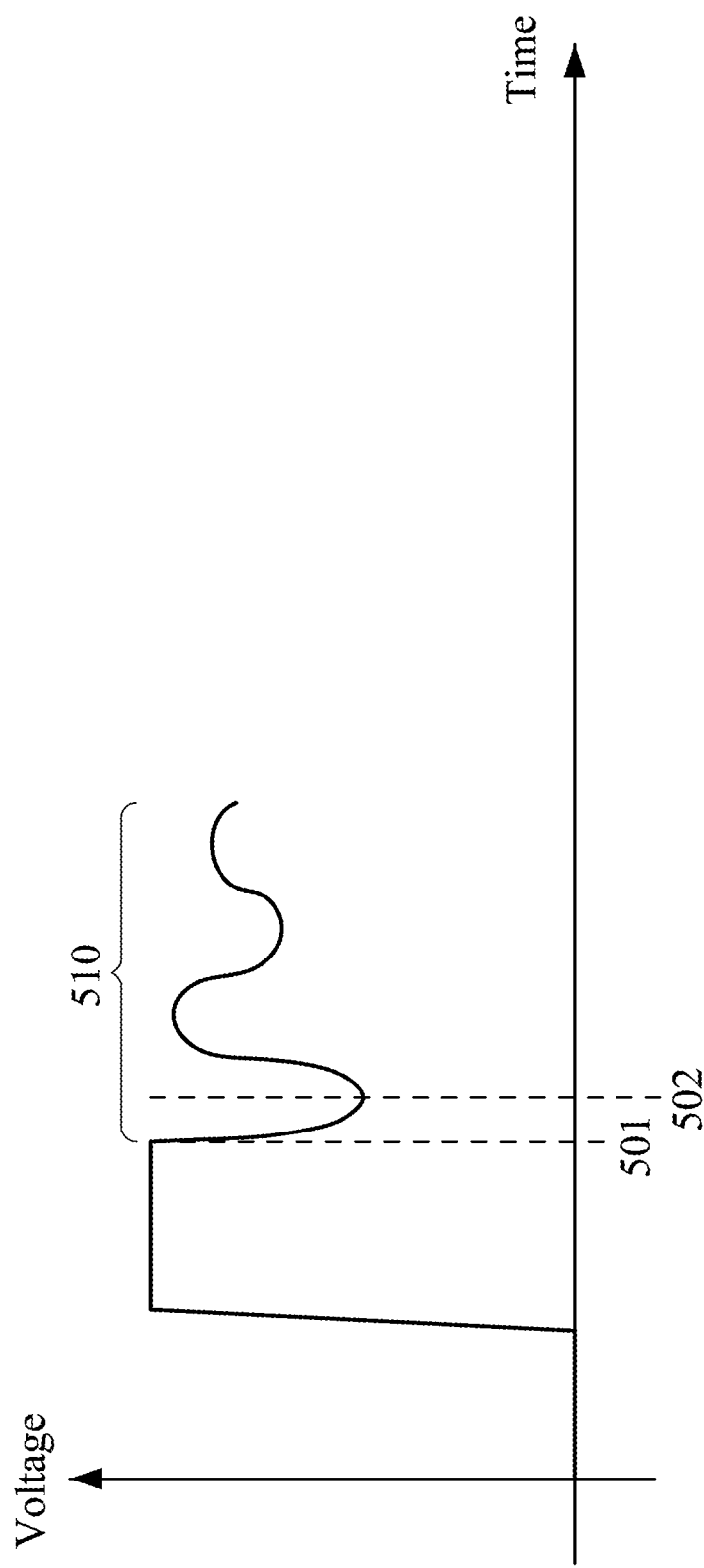
FIG. 5 is the waveform of the specific voltage in the first cycle according to an exemplary embodiment of the present disclosure.

In FIG. 5, the second switch 310 may be turned off at a first timing point 501. Afterwards, the specific voltage (e.g., the first voltage V1) may oscillate to form an oscillation waveform 510 since the isolated power supply 100 may have other parasitic elements (not shown).

Next, in step S430, the controller 230 retrieves a second timing point 502 based on the oscillation waveform 510. In the present embodiment, the second timing point 502 may be a specific timing point when the oscillation waveform reaches a valley. However, in other embodiments, the second timing point 502 may be another specific timing point when the oscillation waveform reaches a peak or other predetermined values specified by the designer. In yet other embodiments, the second timing point 502 may be another specific timing point when the specific voltage crosses a reference voltage specified by the designer, but the present disclosure is not limited thereto.

Afterwards, in step S440, the controller 230 controls the pulse transformer 320 to adaptively adjust a third timing point for turning off the second switch 310 in a second cycle based on the second timing point retrieved in the first cycle.

Figure 6:
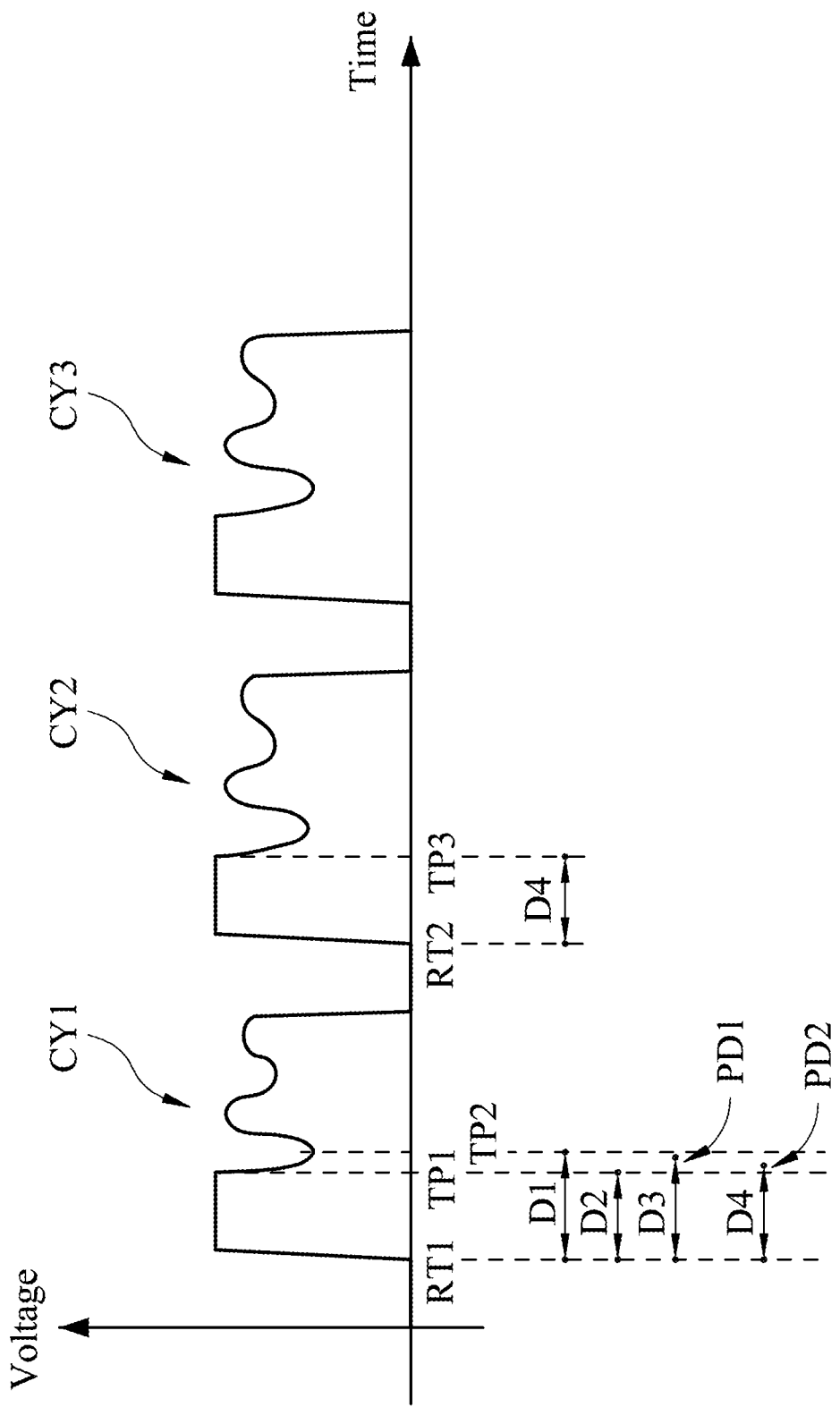
FIG. 6 is a schematic diagram illustrating the mechanism of adjusting the third timing point for turning off the second switch according to an exemplary embodiment of the present disclosure.

See FIG. 6 for better understanding, wherein FIG. 6 is a schematic diagram illustrating the mechanism of adjusting the third timing point for turning off the second switch 310 according to an exemplary embodiment of the present disclosure. In the present embodiment, the second switch 310 is turned on at a first reference timing point RT1 before a first timing point TP1 in a first cycle CY1.

In the first cycle CY1, the controller 230 firstly retrieves a first difference D1 between the first reference timing point RT1 and a second timing point TP2. Secondly, the controller 230 may retrieve a second difference D2 between the first reference timing point RT1 and the first timing point TP1 (i.e., the timing point when the second switch 310 is turned off in the first cycle CY1). Thirdly, the controller 230 may define a third difference D3 via adding the second difference D2 by a first predetermined duration PD1. In various embodiments, the first predetermined duration PD1 may range between 100 ns to 2500 ns, but the present disclosure is not limited thereto.

Fourthly, the controller 230 may generate a determination result after determining whether the third difference D3 is larger than the first difference D1 in the first cycle CY1, and the controller 230 may adjust the second difference D2 as a fourth difference D4 based on the determination result.

In the present embodiment, since the determination result shows that the third difference D3 is not larger than the first difference D1 in the first cycle CY1, the controller 230 may lengthen the second difference D2 by a second predetermined duration PD2 as the fourth difference D4. In various embodiments, the second predetermined duration PD2 may be smaller than the first predetermined duration PD1 and range between 100 ns to 500 ns, but the present disclosure is not limited thereto.

Afterwards, in the second cycle CY2, the second switch 310 is turned on at a second reference timing point RT2, and the controller 230 may control the pulse transformer 320 to turn off the second switch 310 at a third timing point TP3, wherein the third timing point TP3 is later than the second reference timing point RT2 by the fourth difference D4.

In brief, the controller 230 uses the first difference D1 as a reference and determines whether the third difference D3, which is a hypothetically lengthened version of the second difference D2, exceeds the first difference D1. In the case shown in FIG. 6, since the third difference D3 fails to exceed the first difference D1, it represents that the second switch 310 may be allowed to be turned off later in the next cycle. Therefore, the controller 230 slightly lengthens the second difference D2 as the fourth difference D4, and the controller 230 turns off the second switch 310 at the third timing point TP3 in the second cycle CY2, wherein the third timing point TP3 is distant from when the second switch 310 was turned on by the fourth difference D4. As such, the energy of the transformer may be discharged more completely without introducing a negative transformer current, and hence the overall efficiency of the isolated power supply 100 can be improved.

Besides, as can be observed in FIG. 6, the second cycle CY2 is next to the first cycle CY1, which means that the method proposed by the present disclosure uses the information retrieved in the previous cycle to determine when to turn off the second switch 310 in the current cycle. Based on the teachings, the controller 230 may continue to adaptively adjust the timing for turning off the second switch 310 in a third cycle CY3 and the following cycles.

Figure 7:
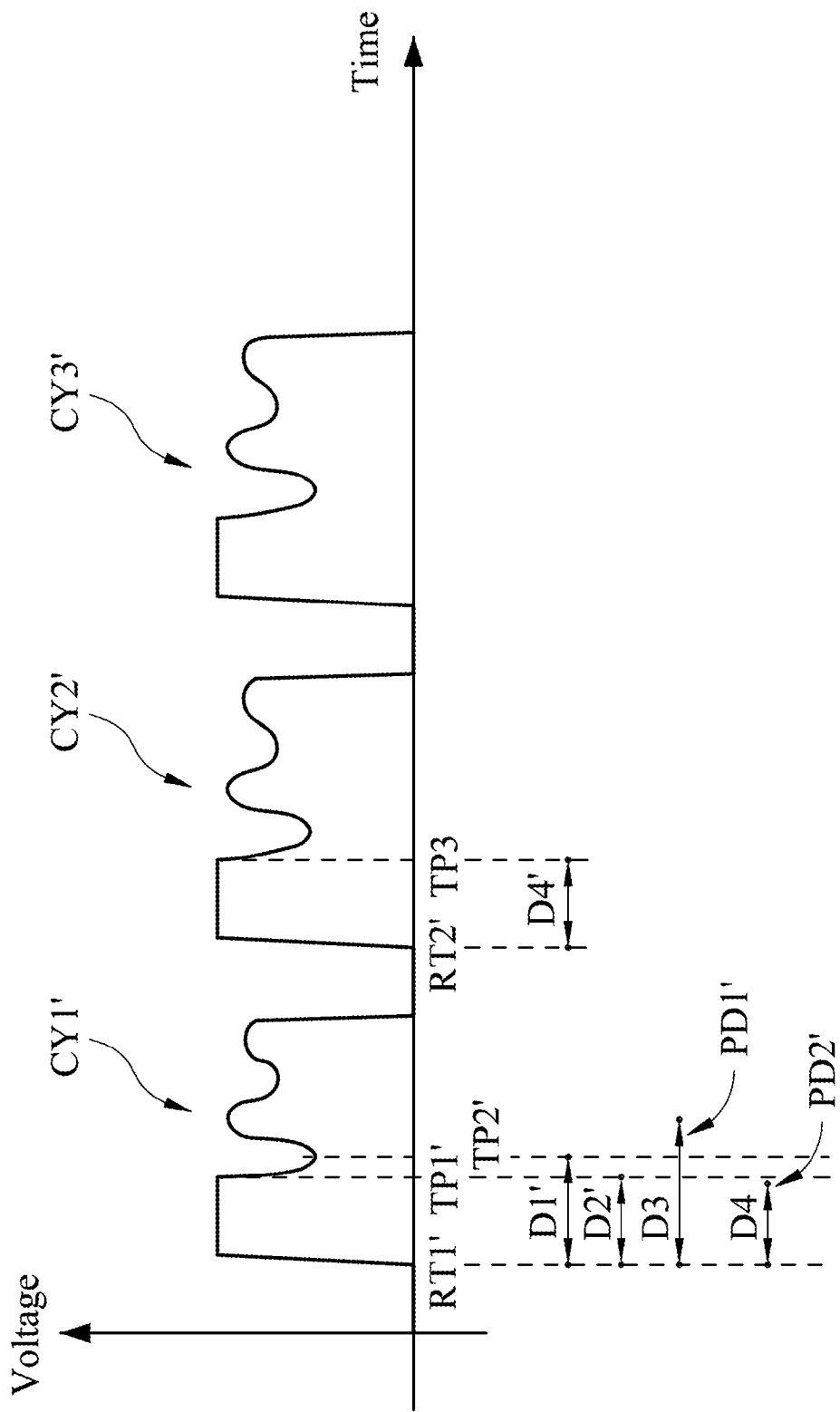
FIG. 7 is a schematic diagram illustrating the mechanism of adjusting the third timing point for turning off the second switch according to another exemplary embodiment of the present disclosure.

See FIG. 7 as another example, wherein FIG. 7 is a schematic diagram illustrating the mechanism of adjusting the third timing point for turning off the second switch 310 according to another exemplary embodiment of the present disclosure. In the present embodiment, the second switch 310 is turned on at a first reference timing point RT1' before a first timing point TP1' in a first cycle CY1'.

In the first cycle CY1', the controller 230 firstly retrieves a first difference D1' between the first reference timing point RT1' and a second timing point TP2'. Secondly, the controller 230 may retrieve a second difference D2' between the first reference timing point RT1' and the first timing point TP1' (i.e., the timing point when the second switch 310 is turned off in the first cycle CY1'). Thirdly, the controller 230 may define a third difference D3' via adding the second difference D2' by a first predetermined duration PD1'. In various embodiments, the first predetermined duration PD1' may range between 100 ns to 2500 ns, but the present disclosure is not limited thereto.

Fourthly, the controller 230 may generate a determination result after determining whether the third difference D3' is larger than the first difference D1' in the first cycle CY1', and the controller 230 may adjust the second difference D2' as a fourth difference D4' based on the determination result.

In the present embodiment, since the determination result shows that the third difference D3' is larger than the first difference D1' in the first cycle CY1', the controller 230 may shorten the second difference D2' by a second predetermined duration PD2' as the fourth difference D4'. In various embodiments, the second predetermined duration PD2' may be smaller than the first predetermined duration PD1' and range between 100 ns to 500 ns, but the present disclosure is not limited thereto.

Afterwards, in the second cycle CY2', the second switch 310 is turned on at a second reference timing point RT2', and the controller 230 may control the pulse transformer 320 to turn off the second switch 310 at a third timing point TP3', wherein the third timing point TP3' is later than the second reference timing point RT2' by the fourth difference D4'.

In brief, the controller 230 uses the first difference D1' as a reference and determines whether the third difference D3', which is a hypothetically lengthened version of the second difference D2', exceeds the first difference D1'. In the case shown in FIG. 7, since the third difference D3' exceeds the first difference D1', it represents that if the second switch 310 is turned off later in the second cycle CY2', the negative transformer current may occur to reduce the overall efficiency of the isolated power supply 100. Therefore, the controller 230 slightly shortens the second difference D2' as the fourth difference D4', and the controller 230 turns off the second switch 310 at the third timing point TP3' in the second cycle CY2', wherein the third timing point TP3' is distant from when the second switch 310 was turned on by the fourth difference D4'. As such, the possibility of having a negative transformer current can be reduced, and hence the overall efficiency of the isolated power supply 100 can be improved.

Besides, as can be observed in FIG. 7, the second cycle CY2' is next to the first cycle CY1', which means that the method proposed by the present disclosure uses the information retrieved in the previous cycle to determine when to turn off the second switch 310 in the current cycle. Based on the teachings, the controller 230 may continue to adaptively adjust the timing for turning off the second switch 310 in a third cycle CY3' or following cycles.

Figure 8:
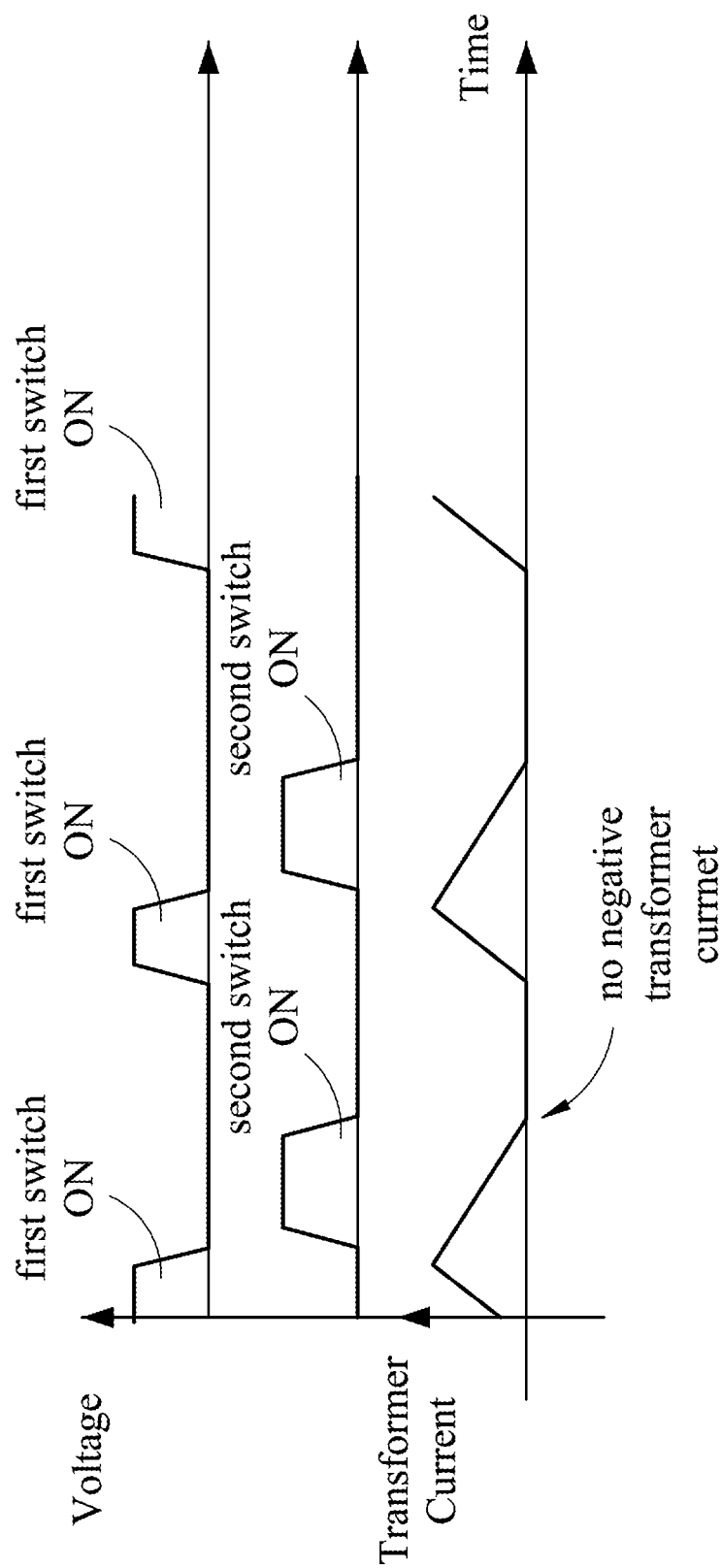
FIG. 8 is a schematic diagram illustrating a sequence of the first switch and the second switch being turned on or off according to the proposed method of the present disclosure.

FIG. 8 is a schematic diagram illustrating a sequence of the first switch 210 and the second switch 310 being turned on or off according to the proposed method of the present disclosure. In the present embodiment, since the second switch 310 may be turned off before the first switch 210 is turned on based on the proposed method of the present disclosure, no negative transformer current will occur, and hence the overall efficiency of the isolated power supply 100 can be improved.

As mentioned in the above, the controller 230 may also retrieve the voltage at the first terminal of the auxiliary winding 220 as the specific voltage. Correspondingly, the layout of FIG. 3 may be modified as the layout shown in FIG. 9, which is another schematic diagram illustrating an isolated power supply 100' according to FIG. 3 of the present disclosure. In the present embodiment, the input terminal of the controller 230 may be coupled to the first terminal of the auxiliary winding 220 for retrieving a second voltage V2 at the first terminal of the auxiliary winding 220. By treating the second voltage V2 as the specific voltage, the controller 230 may perform the method proposed by the present disclosure based on the above teachings, which will not be repeated herein.

Figure 9:
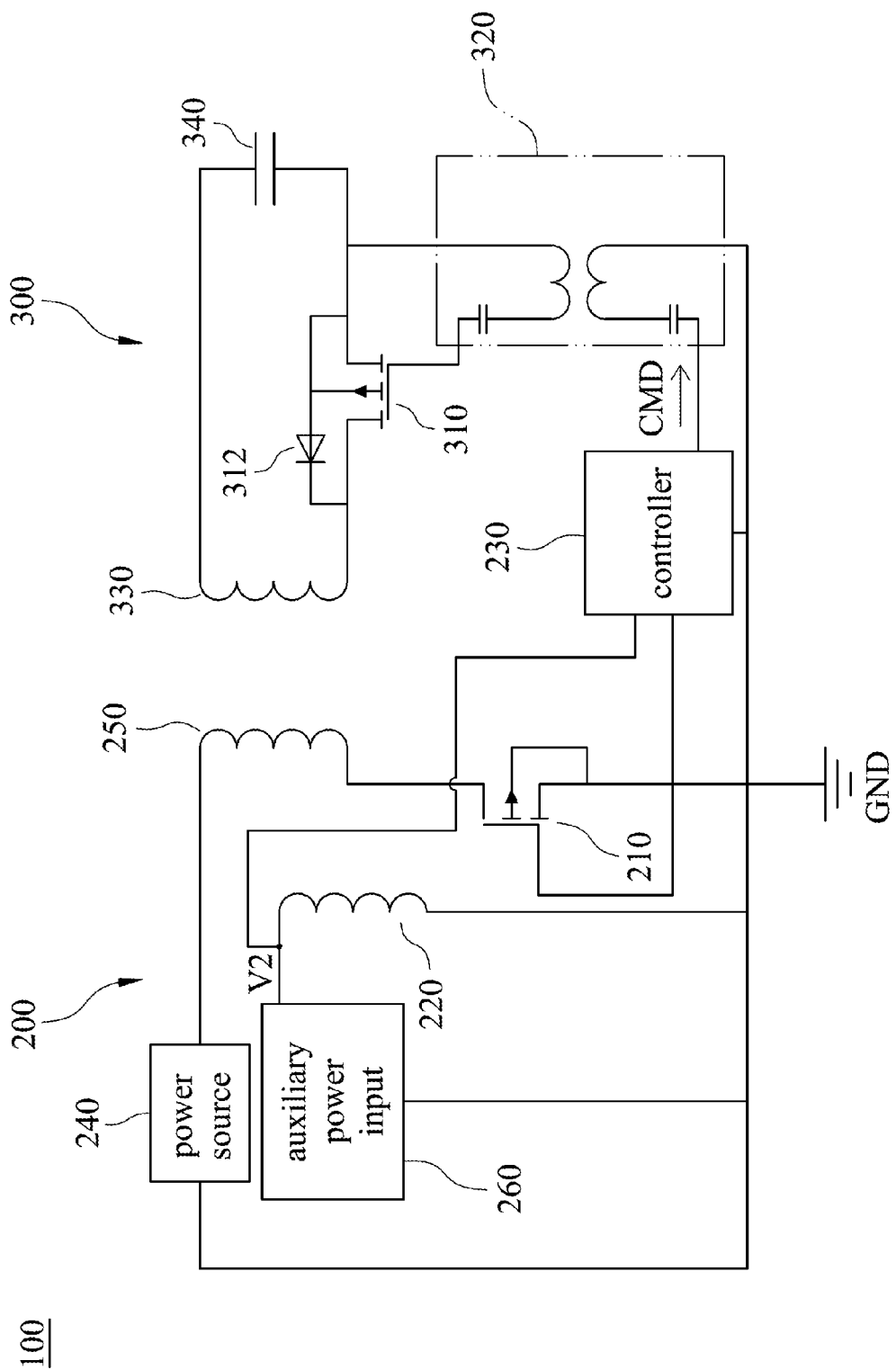
FIG. 9 is another schematic diagram illustrating an isolated power supply according to FIG. 3 of the present disclosure.

In other embodiments, the controller 230 may also retrieve other voltage as the specific voltage as long as the retrieved voltage has a variation similar to the first voltage V1 of FIG. 3 or the second voltage V2 of FIG. 9. For example, the specific voltage may be a voltage which has experienced a voltage division of the first voltage V1 or the second voltage V2, but the present disclosure is not limited thereto.

In one embodiment, when the isolated power supply 100 switches to operate in the CCM, the controller 230 may control the pulse transformer 320 to turn off the second switch 310 right before the first switch 210 is turned on since the controller 230 possess the necessary information to turn off the second switch 310 at proper timing. That is, when the isolated power supply 100 switches to operate in the CCM, the controller 230 may not perform the method of FIG. 4, but the present disclosure is not limited thereto.

To sum up, the present disclosure proposes an isolated power supply and a method for controlling the isolated power supply, which adaptively adjusts the timing for turning off the second switch (i.e., the SRMOS at the secondary side circuit) based on the oscillation waveform of the voltage of the transformer in the previous cycle. Specifically, the controller may adaptively turn off the SRMOS earlier or later in the next cycle after determining whether a lengthened version of the second difference (i.e., the difference between when the SRMOS is turned on and a specified timing point in the oscillation waveform) is about to introduce the negative transformer current in the current cycle. If yes, the controller may turn off the SRMOS earlier in the next cycle to avoid the negative transformer current, otherwise the controller may turn off the SRMOS later in the next cycle to discharge the transformer more completely. As such, the possibility of having a negative transformer current can be reduced, and hence the overall efficiency of the isolated power supply can be improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An isolated power supply, comprising:
a primary side circuit, comprising:
a first switch having a first voltage thereon;
an auxiliary winding having a first terminal and a second terminal; and
a controller coupled to the first switch or the auxiliary winding, and retrieving the first voltage at the first switch or a second voltage at the first terminal of the auxiliary winding as a specific voltage;
a secondary side circuit coupled to the primary side circuit and comprising:
a second switch; and
a pulse transformer coupled to the second switch and the controller, wherein the pulse transformer turns off the second switch in response to a command from the controller,
wherein the controller senses an oscillation waveform of the specific voltage after the second switch is turned off at a first timing point in a first cycle, retrieves a second timing point based on the oscillation waveform, controls the pulse transformer to adaptively adjust a third timing point for turning off the second switch in a second cycle based on the second timing point retrieved in the first cycle;
wherein the second switch is turned on at a first reference timing point before the first timing point in the first cycle, and the second switch is turned on at a second reference timing point before the third timing point in the second cycle,
wherein the controller is configured to:
retrieve a first difference between the first reference timing point and the second timing point;
retrieve a second difference between the first reference timing point and the first timing point;
define a third difference via adding the second difference with a first predetermined duration;
generate a determination result after determining whether the third difference is larger than the first difference in the first cycle;
adjust the second difference as a fourth difference based on the determination result; and
control the pulse transformer to turn off the second switch at the third timing point, wherein the third timing point is later than the second reference timing point by the fourth difference.

2. The isolated power supply of claim 1, wherein the second timing point is a specific timing point when the oscillation waveform reaches a valley or a peak.

3. The isolated power supply of claim 1, wherein the second timing point is a specific timing point when the specific voltage crosses a reference voltage.

4. The isolated power supply of claim 1, wherein the second cycle is next to the first cycle.

5. The isolated power supply of claim 1, wherein the controller lengthens the second difference by a second predetermined duration as the fourth difference if the determination result shows that the third difference is not larger than the first difference in the first cycle.

6. The isolated power supply of claim 1, wherein the controller shortens the second difference by a second predetermined duration as the fourth difference if the determination result shows that the third difference is larger than the first difference in the first cycle.

7. The isolated power supply of claim 1, wherein the isolated power supply operates in a discontinuous conduction mode.

8. The isolated power supply of claim 7, wherein when the isolated power supply switches to operate in a continuous conduction mode, the controller controls the pulse transformer to turn off the second switch right before the first switch is turned on.

9. The isolated power supply of claim 1, wherein the first switch has a first terminal, a second terminal coupled to a ground, and a control terminal, the controller has an input terminal coupled to the first terminal of the auxiliary winding or the first terminal of the first switch, a first output terminal coupled to the control terminal of the first switch, a second output terminal, and a ground terminal coupled to the ground, wherein the primary side circuit further comprises:
a power source having a first terminal and a second terminal, wherein the second terminal of the power source is coupled to the ground;
a first winding having a first terminal and a second terminal, wherein the first terminal of the first winding is coupled to the first terminal of the power source, and the second terminal of the first winding is coupled to the first terminal of the first switch; and
an auxiliary power input having a first terminal and a second terminal, wherein the first terminal of the auxiliary power input is coupled to the first terminal of the auxiliary winding, and the second terminal of the auxiliary power input is coupled to the ground.

10. The isolated power supply of claim 9, wherein the second switch has a first terminal, a second terminal, and a control terminal, the pulse transformer has a first input terminal coupled to the first terminal of the second switch, a second input terminal coupled to the second output terminal of the controller, an output terminal coupled to the control terminal of the second switch, and a ground terminal coupled to the ground, and the secondary side circuit further comprises:
a second winding having a first terminal and a second terminal, wherein the second terminal of the second winding is coupled to the second terminal of the second switch; and
an output capacitor having a first terminal and a second terminal, wherein the first terminal of the output capacitor is coupled to the first terminal of the second winding, and the second terminal of the output capacitor is coupled to the first terminal of the second switch.

11. A method of controlling an isolated power supply comprising a primary side circuit and a secondary side circuit, wherein the primary side circuit comprises a first switch with a first voltage thereon, an auxiliary winding with a second voltage thereon, and a controller, the secondary side circuit comprises a second switch and a pulse transformer, and the method comprises following steps:
retrieving, by the controller, the first voltage or the second voltage as a specific voltage;
sensing, by the controller, an oscillation waveform of the specific voltage after the second switch is turned off at a first timing point in a first cycle;
retrieving, by the controller, a second timing point based on the oscillation waveform; and
controlling, by the controller, the pulse transformer to adaptively adjust a third timing point for turning off the second switch in a second cycle based on the second timing point retrieved in the first cycle;
wherein the second switch is turned on at a first reference timing point before the first timing point in the first cycle, and the second switch is turned on at a second reference timing point before the third timing point in the second cycle, wherein the step of controlling, by the controller, the pulse transformer to adaptively adjust the third timing point for turning off the second switch in the second cycle based on the second timing point retrieved in the first cycle comprises:
retrieving a first difference between the first reference timing point and the second timing point;
retrieving a second difference between the first reference timing point and the first timing point;
defining a third difference via adding the second difference with a first predetermined duration;
generating a determination result after determining whether the third difference is larger than the first difference in the first cycle;
adjusting the second difference as a fourth difference based on the determination result; and
controlling the pulse transformer to turn off the second switch at the third timing point, wherein the third timing point is later than the second reference timing point by the fourth difference.

12. The method of controlling the isolated power supply of claim 11, wherein the second timing point is a specific timing point when the oscillation waveform reaches a valley or a peak.

13. The method of controlling the isolated power supply of claim 11, wherein the second timing point is a specific timing point when the specific voltage crosses a reference voltage.

14. The method of controlling the isolated power supply of claim 11, wherein the second cycle is next to the first cycle.

15. The method of controlling the isolated power supply of claim 11, wherein the step of adjusting the second difference as the fourth difference based on the determination result comprises lengthening, by the controller, the second difference by a second predetermined duration as the fourth difference if the determination result shows that the third difference is not larger than the first difference in the first cycle.

16. The method of controlling the isolated power supply of claim 11, wherein the step of adjusting the second difference as the fourth difference based on the determination result comprises shortening, by the controller, the second difference by a second predetermined duration as the fourth difference if the determination result shows that the third difference is larger than the first difference in the first cycle.

17. The method of controlling the isolated power supply of claim 11, wherein the isolated power supply operates in a discontinuous conduction mode.

18. The method of controlling the isolated power supply of claim 17, wherein when the isolated power supply switches to operate in a continuous conduction mode, the method further comprises controlling, by the controller, the pulse transformer to turn off the second switch right before the first switch is turned on.

* * * * *